United States Patent
Pye et al.

(10) Patent No.: US 12,480,856 B2
(45) Date of Patent: Nov. 25, 2025

(54) DIFFERENTIAL STICKING TEST FIXTURE

(71) Applicant: SAUDI ARABIAN OIL COMPANY, Dhahran (SA)

(72) Inventors: Richard Mark Pye, Aberdeenshire (GB); Rae Andrew Younger, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 534 days.

(21) Appl. No.: 18/064,838

(22) Filed: Dec. 12, 2022

(65) Prior Publication Data
US 2024/0192106 A1   Jun. 13, 2024

(51) Int. Cl.
*G01N 11/14* (2006.01)
*G01N 35/04* (2006.01)

(52) U.S. Cl.
CPC .......... *G01N 11/142* (2013.01); *G01N 35/04* (2013.01); *G01N 2035/0441* (2013.01); *G01N 2035/0479* (2013.01)

(58) Field of Classification Search
CPC .............. G01N 11/142; G01N 35/04; G01N 2035/0441; G01N 2035/0479; E21B 41/00
See application file for complete search history.

(56) References Cited

U.S. PATENT DOCUMENTS 4,428,441 A * 1/1984 Dellinger ............... E21B 17/04
                                                    175/325.1
5,052,219 A * 10/1991 Fery ..................... E21B 49/005
                                                    73/152.52

(Continued)

FOREIGN PATENT DOCUMENTS

GB        2275342 A     8/1994

OTHER PUBLICATIONS

A. Biondi et al.; "Laboratory Equipment to Study Differential Pressure Sticking and Drill String Release Mechanism", Offshore Mediterranean Conference and Exhibition; Mar. 2019; pp. 1-12 (12 pages).

(Continued)

*Primary Examiner* — Xin Y Zhong
(74) *Attorney, Agent, or Firm* — Osha Bergman Watanabe & Burton LLP (57) ABSTRACT

A test fixture includes a cylindrical main body extending in a longitudinal direction that receives a test piece. The main body includes a cylindrical screen filter with a mesh surface that extends in along a longitudinal axis coincident with an axis of the main body. The mesh surface generates a filter cake when particle-entrained fluid is supplied through the mesh surface and the particulate is retained on the mesh surface. The main body also includes an offset shaft that extends in the longitudinal direction along an offset axis that is offset from the axis of the main body, and the test piece extends through the offset shaft and the interior of the screen filter. The main body further includes a bearing that decouples rotational motion of the offset shaft from the end cap. Additionally, the test fixture includes an actuator that dislodges the test piece from the filter cake, a computer that determines the dislodging force, and a reservoir pump that pumps the particle-entrained fluid into the screen filter. When the alignment wheel is actuated, the offset shaft forces the test piece to move from a first position where a longitudinal axis of the test piece is coincident to the longitudinal axis of the screen filter to a second position in which the axes are offset.

20 Claims, 10 Drawing Sheets

(56) References Cited

U.S. PATENT DOCUMENTS

| | | | |
|---|---|---|---|
| 5,555,937 | A | 9/1996 | Fisk, Jr. et al. |
| 6,601,456 | B1 | 8/2003 | Davidson et al. |
| 8,579,026 | B2 | 11/2013 | Housden et al. |
| 2017/0306726 | A1* | 10/2017 | Alzahrani ............... E21B 44/00 |

OTHER PUBLICATIONS

C. M. Prieto; "Design of a Laboratory System for the Prediction of Wireline Tool Sticking", Masters Thesis, Massachusetts Institute of Technology; Jun. 1999; pp. 1-102 (102 pages).

Y.M. Bushnell Watson and S.S. Panesar; "Differential Sticking Laboratory Tests Can Improve Mud Design", SPE-22549; Society of Petroleum Engineers; Oct. 1991; pp. 1-10 (10 pages).

International Search Report and Written Opinion of the International Searching Authority issued in corresponding International Application No. PCT/US2023/083352, mailed Apr. 3, 2024 (14 pages).

* cited by examiner

DIFFERENTIAL STICKING TEST FIXTURE

BACKGROUND

During a process of constructing a wellbore, a drill string including drill pipe, drill collars, measurement tools, string stabilizers, drilling motors, rotary steerable tools, and a drill bit are used to break the rock formation and correctly position the wellbore. Additionally, drilling fluid, commonly referred to as "mud." is pumped from the surface to cool and lubricate the drill string and carry drilled rock cuttings back to the surface. The mud also acts as a primary barrier against formation fluids entering the wellbore, which prevents influxes, or "kicks," from occurring. The pressure exerted by the fluid column is engineered to be greater than the pressure of the formation fluids within the well (overbalanced), but can be balanced or less than the pressure of the formation fluids (underbalanced).

The rock formations that are in the process of being drilled have a porosity and permeability, and the pressure exerted by the drilling mud can force the drilling mud into the formation and displace the fluids which are there. This action filters out the solids from the mud, leaving a layer of 'cake' on the surface of the borehole wall. Once the filter cake reaches a required thickness, the filter cake prevents further fluid losses to the formation. In high angle and horizontal wells, the drill collars tend to lie on the bottom of the wellbore due to the force of gravity, and will come into contact with the mud filter cake. Drilled cuttings can also accumulate around the drill collars if flow rates and fluid agitation are insufficient to mobilize the drilled cuttings through the wellbore.

If the well conditions are right, such as an overbalanced annular pressure compared to the formation pressure, a porous formation, and a thick filter cake, and if the drill collar embeds into the filter cake, then the pressure exerted by the mud on the exposed collar surface is greater than the pressure exerted by the formation on the embedded portion of the collar. This pressure differential causes large side forces to push the drill collar against the formation. Furthermore, the forces can exceed the mechanical specifications of the drill pipe and the rotating capacity of the rig, making it impossible to recover the drill string. In this situation, the pipe is differentially stuck and both the amount of force require to pull the stuck pipe free and the amount of force generated by the formation can be calculated.

SUMMARY

In one or more embodiments, a test fixture includes a cylindrical main body extending in a longitudinal direction that receives a test piece. The main body includes a cylindrical screen filter with a mesh surface that extends in along a longitudinal axis coincident with an axis of the main body. The mesh surface generates a filter cake when particle-entrained fluid is supplied through the mesh surface and the particulate is retained on the mesh surface. The main body also includes an offset shaft that extends in the longitudinal direction along an offset axis that is offset from the axis of the main body, and the test piece extends through the offset shaft and the interior of the screen filter. The main body further includes a bearing that decouples rotational motion of the offset shaft from the end cap. Additionally, the test fixture includes an actuator that dislodges the test piece from the filter cake, a computer that determines the dislodging force, and a reservoir pump that pumps the particle-entrained fluid into the screen filter. When the alignment wheel is actuated, the offset shaft forces the test piece to move from a first position, where a longitudinal axis of the test piece is coincident to the longitudinal axis of the screen filter, to a second position in which the axes are offset.

In one or more embodiments, a method for determining sticking forces applied to a test piece includes receiving a test piece within a cylindrical screen filter of a cylindrical main body extending in a longitudinal direction. The screen filter extends along a coincident axis with an axis of the main body. The method further includes decoupling the rotational motion of an offset shaft from the main body, and the test piece extends through the offset shaft. Additionally, the method includes circulating particle-entrained fluid through a mesh surface of the screen filter, which generates a filter cake when the particle-entrained fluid is supplied through the screen filter. After the fluid is circulated, an alignment wheel is actuated that rotates the offset shaft that the test piece extends through. This causes the test piece to move from a first position where the longitudinal axis of the test piece is coincident with the axis of the main body to a second position where the test piece is embedded within the filter cake. Subsequently, additional fluid is circulated through the screen filter, which causes the filter cake to regenerate around the test piece. The additional fluid creates a differential pressure that forces the test piece to translate within the filter cake to a resting position. Next, the test piece is actuated, which dislodges the test piece from the filter cake, and the force required to dislodge the test piece from the filter cake is determined.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a test fixture as described herein. In this respect, the term "upper" denotes an element disposed further from the surface of the Earth than a corresponding "lower" element when the test fixture is disposed above ground, while the term "lower" conversely describes an element disposed closer to the surface of the Earth than a corresponding "upper" element. Likewise, the term "axial" refers to an orientation substantially parallel an extension direction of an actuator disposed within the test fixture, while the term "radial" denotes a direction orthogonal to an axial direction.

In general, one or more embodiments of the disclosure are directed towards a test fixture that generates and measures differential sticking forces that may affect a drill string component. More specifically, one or more embodiments of the disclosure are directed towards generating a filter cake that surrounds a test piece (e.g., shown in FIG. 2) that is representative of the drill string components.

During operation, a reservoir of the test fixture is operated to circulate particle-entrained fluid through a mesh surface of a screen filter that surrounds the test piece. The particulate-entrained fluid is commonly referred to in the art as drilling mud, and is formed from a base fluid, such as oil or water, and a series of particulate additives that are designed to give the mud specific tribological properties such as viscosity and lubricity. As the drilling mud enters a wellbore formation, the additives may be filtered out by pores in the rock, causing a mud cake of the additives to form on a wall of the wellbore. Thus, the process of circulating the particulate-entrained fluid through the test fixture is akin to the process of drilling through a wellbore, as the test fixture generates a filter cake that is similar to a mud cake that forms on a wall of a wellbore.

Once the filter cake is generated on the inner surface of the screen filter, the test piece is moved from a first position to a second position. A pressure is applied to the inner surface of the screen filter, which, in turn, applies a pressure to the part of the test piece that is not in contact with the filter cake. The test piece is then rotated and actuated, and the forces required to rotate and actuate the test piece are logged by the test fixture to determine the sticking forces applied to the test piece.

Figure 1:
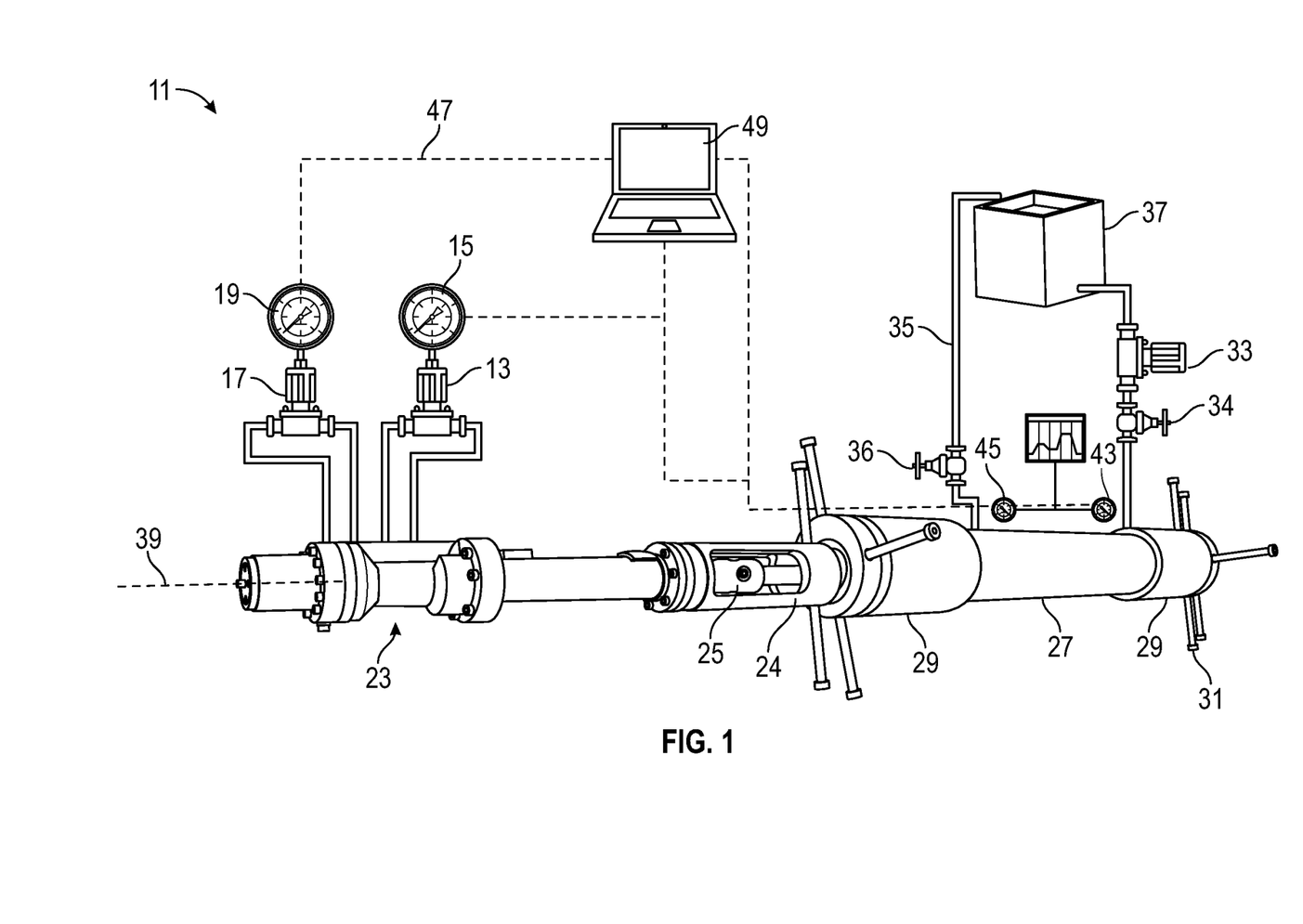
FIG. 1 depicts an overview of one embodiment of a test fixture in accordance with one or more embodiments of the invention.

One such embodiment of the invention that may be used to determine the differential sticking forces is depicted in FIG. 1. Specifically. FIG. 1 depicts an overview of a test fixture 11, which is formed by a roto-linear actuator 23, an actuator coupling 24, a shaft coupling 25, a main body 27, a reservoir 37, and computer 49. As shown in FIG. 1, the various components are disposed in sequence along a common axis in the first common position such that the roto-linear actuator 23, the actuator coupling 24, the shaft coupling 25, and the main body 27 share a longitudinal axis 39.

Additionally, the main body 27 includes end caps 29 at each of its longitudinal ends. The end caps 29 are each configured with an internal thread (not shown) and assembly handles 31. The assembly handles 31 allow the end caps 29 to be attached to the main body 27, and are sized and shaped such that an operator of the test fixture 11 can manually attach the end caps 29 to the main body 27. In addition, the end caps 29 may be detached from the main body 27 in order to receive a test piece into the main body 27, or remove a test piece from the main body 27 after operation.

During operation, the reservoir 37 circulates fluid through a series of fluid lines 35 into the main body 27. The fluid lines 35 may be formed, for example, from a rubber or other elastic polymer compounds, and fluidly connect to the various pumps described herein. In order to circulate the fluid through the fluid lines 35, the reservoir 37 includes a reservoir pump 33, which may be a hydraulic pump as is commonly known in the art. The reservoir 37 is further configured with an inlet valve 34 and an outlet valve 36, which are check valves configured to ensure that fluid flows through the main body 27 prior to re-entering the reservoir 37. Finally, the reservoir 37 includes an inlet pressure gauge 43 and an outlet pressure gauge 45, which measure the respective inlet and outlet pressures of the reservoir pump 33 and reservoir 37. The inlet pressure gauge 43 and outlet pressure gauge 45 are connected to the computer 49 via data connections 47, which may be a wired connection such as Universal Serial Bus (USB) or ethernet, or a wireless connection such as Wi-Fi, Bluetooth®, or Near Field Communication (NFC).

Elements of the computer 49 are intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Furthermore, the computer 49 may include an input device, such as a keypad, keyboard, touch screen, or other device that accepts user information, and an output device that conveys information associated with the operation of the computer 49, including digital data, visual data (such as output graphs), audio information, or a Graphical User Interface (GUI).

The computer 49 may serve in a role as a client, network component, a server, a database or other persistency, or any other component (or a combination of roles) of a computer system for performing the subject matter described in the instant disclosure. Furthermore, each of the components of the computer 49 may be interconnected using a system bus (not shown). In some implementations, any or all components of the computer 49, including both hardware or software, may interface with each other using an application programming interface (API) (not shown), a service layer (not shown), or a combination thereof. The API includes specifications for routines, data structures, and object classes, and may be computer-language independent or dependent and, thus, refer to a complete interface, a single function, or even a set of APIs. Similarly, the service layer provides software services to the computer 49 or other components that are communicably coupled to the computer 49.

The computer 49 further includes at least one computer processor (not shown), which executes instructions and manipulates data to perform the operations of the computer 49 and any methods and procedures as described in the instant disclosure. The computer 49 also includes a memory (not shown) that holds data for the computer 49 and/or other connected components. By way of example, the memory is a database storing pressure and force data consistent with this disclosure, such as data output from the various pressure gauges recited above.

Continuing with FIG. 1, the test piece is disposed centrally within the main body 27, and in this position, the test piece is aligned with the longitudinal axis 39. Internal to the main body 27 is a screen filter (e.g., FIG. 4), and fluid is pumped from the reservoir 37 into the main body 27, through the screen filter, and back through the main body 27 to the reservoir 37. As the fluid passes through the screen filter (e.g., FIG. 4), a filter cake builds on the internal surface of the screen filter. When a sufficient filter cake has been developed, the inlet pressure will rise as the fluid is prevented from transitioning across the screen. The inlet and outlet pressures can be monitored by the inlet pressure gauge 43 and outlet pressure gauge 45, respectively. The process of embedded and successively dislodging a test piece from a filter cake is further described below.

After the test piece has been manipulated into position against the filter cake, hydraulic pressure is developed on the interior of the screen filter 85 by operating the reservoir pump 33. When a desired pressure is reached, the inlet valve 34 and the outlet valve 36 are closed to trap pressure within the main body 27. Furthermore, if pressure cannot be maintained, the reservoir pump 33 is operated during the test and the outlet valve 36 closed to reduce flow. As noted above, the inlet pressure gauge 43 and the outlet pressure gauge 45 measure the pressure differential created by the reservoir pump 33. Subsequently, the roto-linear actuator 23 is actuated in a rotational direction, a linear direction, and/or a combination thereof. The longitudinal force and/or torque required to dislodge the stuck test piece are captured by the linear pressure gauge 15 and the rotary pressure gauge 19, which transmits the force and/or torque to the computer 49 via the data connections 47. Additionally, or alternatively, the shaft coupling 25 may include instruments, such as a load or torque cell, to measure axial loads and/or torques, which are transmitted to the computer 49.

Figure 2:
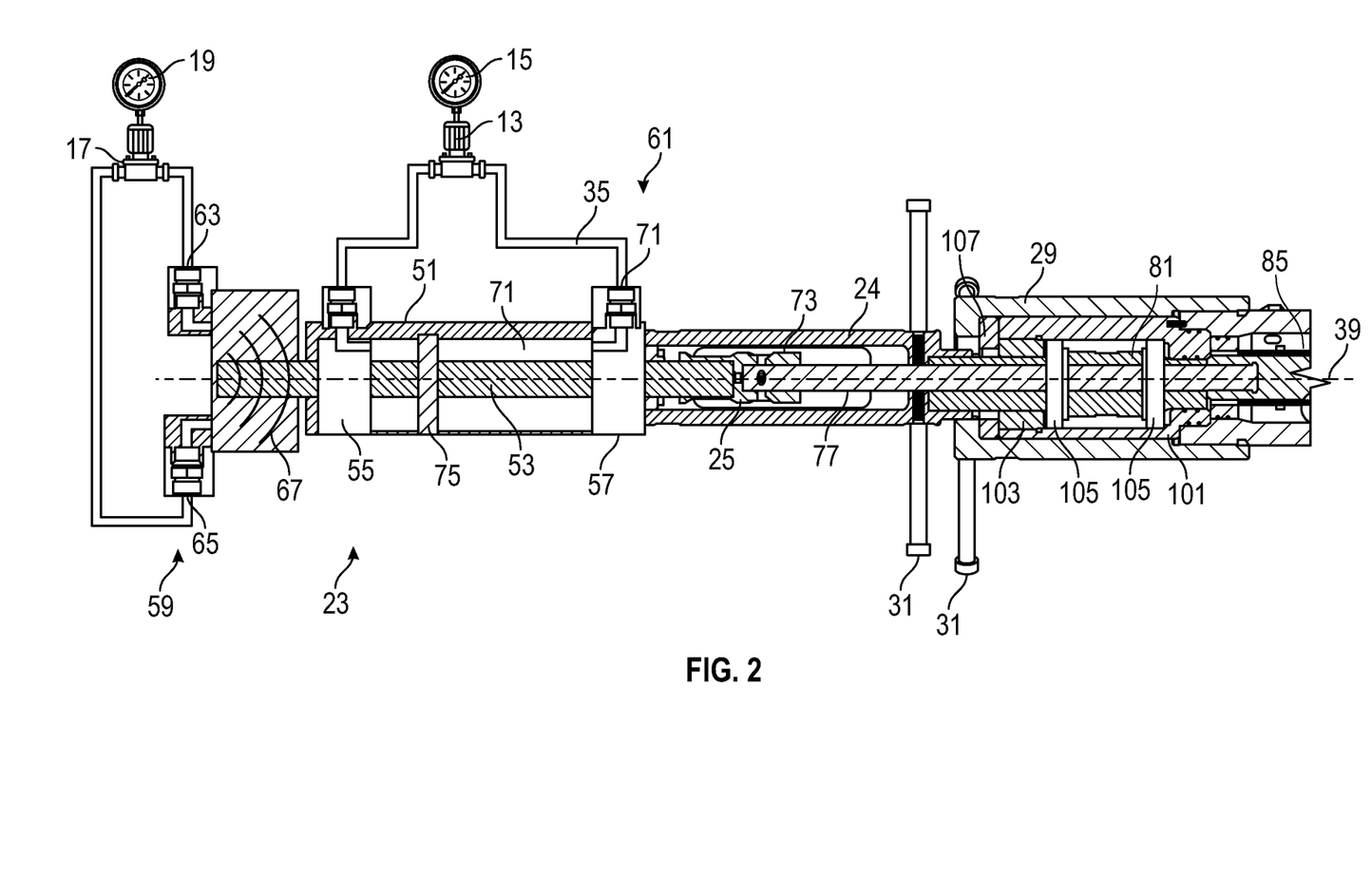
FIG. 2 depicts a side view of a roto-linear actuator in accordance with one or more embodiments of the invention.

FIG. 2 depicts one embodiment of a roto-linear actuator 23 as described herein. Unless noted otherwise, components of the roto-linear actuator 23 may be formed of various metals including, but not limited to, aluminum, steel, steel alloys, titanium, or equivalent. As shown in FIG. 2, the roto-linear actuator 23 includes an actuator housing 51 that houses an actuator shaft 53. The actuator shaft 53 is retained within the actuator housing 51 at a first longitudinal end by a first shaft guide 55 and at a second longitudinal end by a second shaft guide 57. The shaft guides 55 and 57 are formed as annular discs with an outer diameter matching that of the inner diameter of the actuator housing 51, and are rigidly fixed thereto.

To provide both linear and rotary actuation to the actuator shaft 53, the roto-linear actuator 23 includes a rotary actuator 59 and a linear actuator 61. The rotary actuator 59 includes a rotation inlet port 63 and a rotation outlet port 65, which transmit fluid in a closed system from the rotary pump 17 across a plurality of vanes 67 that are rigidly fixed to the actuator shaft 53, and back to the rotary pump 17. The fluid may be, for example, water or oil. As the fluid is transmitted across the vanes 67, the hydrodynamic forces of the fluid cause the vanes 67 to actuate, thereby causing the actuator shaft 53 to rotate as well. Forces generated by the rotary actuator 59 and the linear actuator 61 are captured using the data connections 47 and transmitted to the computer 49, which retains the data in order to determine the sticking forces affecting a test piece 77.

Linear actuation of the actuator shaft 53 is generated by the linear actuator 61. As shown in FIG. 2, the linear actuator 61 includes a linear inlet port 71 and a linear outlet port 73, which are substantially similar to the rotation inlet port 63 and the rotation outlet port 65, and may be formed, for example, from a steel alloy or equivalent. As fluid is introduced into the linear actuator 61 via the linear inlet port 71, fluid pressure develops in the region between the first shaft guide 55 and a diaphragm 75, which is rigidly fixed to the actuator shaft 53. In addition, fluid is removed from the space between the second shaft guide 57 and the diaphragm 75, which creates a differential pressure across the diaphragm 75. This differential pressure causes the diaphragm 75, and, thus, the actuator shaft 53, to actuate along the longitudinal axis 39.

In order to mechanically couple the roto-linear actuator 23 directly to a test piece 77, the actuator shaft 53 is rigidly fixed to the test piece 77 with a shaft coupling 25. In particular, and although not shown in FIG. 2, the shaft coupling 25 employs a retention mechanism, such as a set screw, key/keyhole, clamp, or bolt that rigidly fixes the actuator shaft 53 to the shaft coupling 25. The shaft coupling 25 is fixed, at its other end, to the test piece 77 using one of the retention mechanisms outlined above and may be formed of a metal or metal alloy including steel, iron, aluminum, or equivalent. Thus, the shaft coupling 25 directly connects the actuator shaft 53 to the test piece 77 and forces the test piece 77 to actuate in tandem with the actuator shaft 53.

As shown in FIG. 2, the roto-linear actuator 23 is fixed to the end cap 29 via the actuator coupling 24. While the actuator coupling 24 is rigidly fixed to the roto-linear actuator 23, the actuator coupling 24 is allowed to rotate within the end cap 29 and is instead rigidly fixed to the offset shaft 81 disposed within the end cap 29. Thus, the actuator coupling 24 couples the rotation of the offset shaft 81 to the roto-linear actuator 23 such that the roto-linear actuator 23 rotates with the offset shaft 81. Furthermore, the test piece 77 is free to rotate and translate within the offset shaft 81, which allows the actuator shaft 53 and test piece 77 to move axially, radially, or rotationally within the main body 27.

In addition to the offset shaft 81, the end cap 29 includes one or more thrust nuts 103, a spacer 107, a bearing housing 101, and bearings 105. The bearing housing 101 is configured to house the one or more thrust nuts 103 and bearings 105 and is fixed to the main body 27 with a pin, while the test piece 77 and offset shaft 81 extend through a hollow portion of the bearing housing 101. Accordingly, during operation, the bearings 105 decouple the rotational motion of the offset shaft 81 and test piece 77 from the main body 27, end cap 29, and screen filter 85, and allow the offset shaft 81 to rotate freely. Thus, the bearings 105, in conjunction with the actuator coupling 24, allow the end cap 29, main body 27, and screen filter 85 to remain stationary while the test piece 77 and actuator shaft 53 actuate. One or more thrust nuts 103 serve to clamp the bearing 105 in place, which prevents axial movement of the bearing 105. In addition, FIG. 2 depicts that the spacer 107 abuts the bearing housing 101 against the main body 27, and further prevents the thrust nut 103 from disengaging from the bearing 105.

Figure 3:
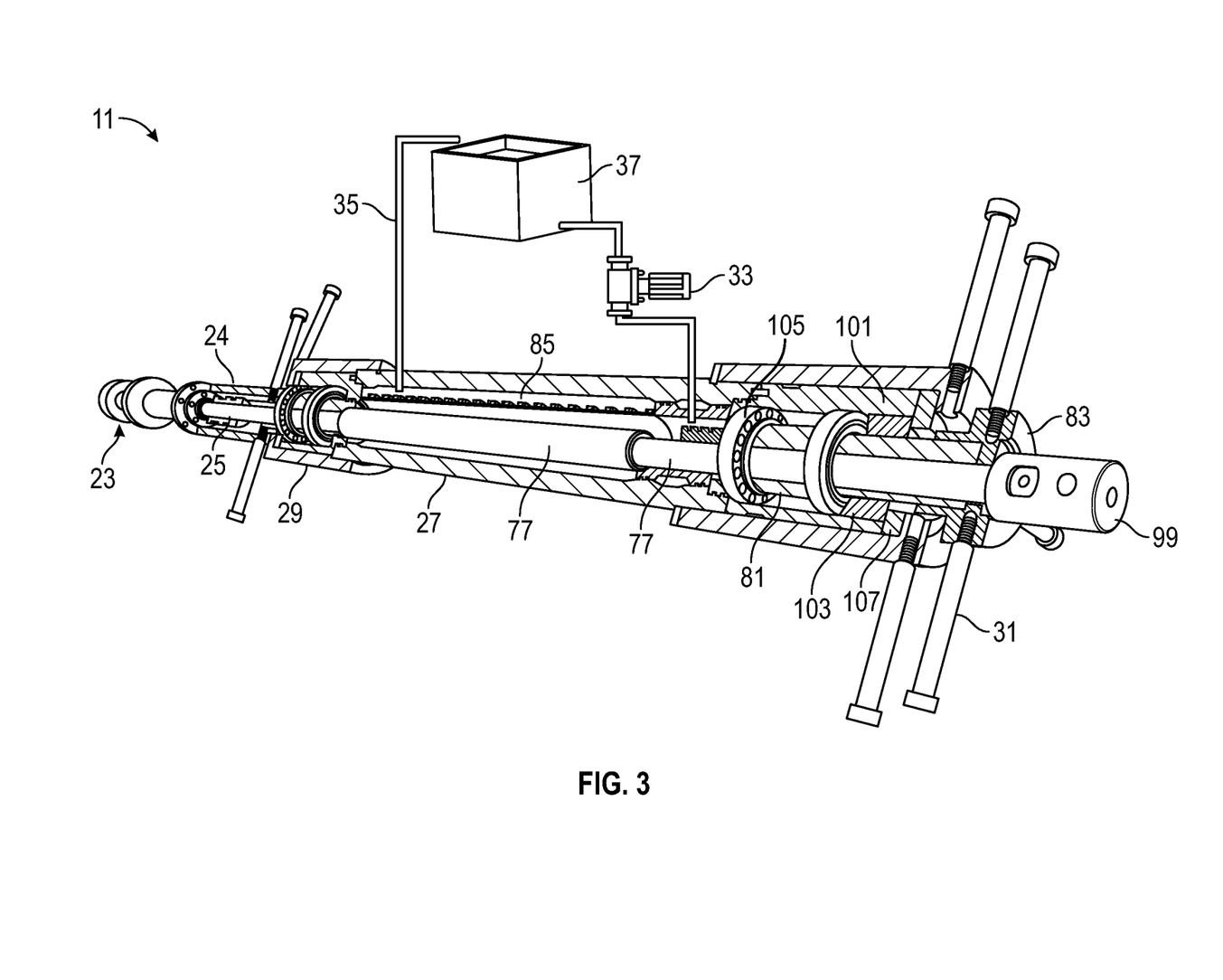
FIG. 3 depicts a second view of a test fixture in accordance with one or more embodiments of the invention.

FIG. 3 depicts a second view of a test fixture 11 as described herein. As shown in FIG. 3, the test piece 77 is fixed to the shaft coupling 25 at its first longitudinal end, and is fixed to an alignment cap 99 at its other longitudinal end. The alignment cap 99 has a series of holes that allow assembly handles 31 to be inserted into the alignment cap 99, which are manually actuated to rotate the alignment cap 99 and test piece 77. Thus, the alignment cap 99 is rotated to manipulate the test piece 77 during assembly to align the shaft coupling 25 with the roto-linear actuator 23 at its other end. In addition, the alignment wheel 83 and actuator coupling 24 are attached to offset shaft 81, which, in turn, are allowed to freely rotate within the bearing housing 101.

The central bores of the offset shaft 81 and the bearing housing 101 are not concentric with their outer diameters, which allows the central bore axis of the offset shaft 81 to be offset in relation to the center axis of the Screen Filter 85. That is, because the offset shaft 81 must be rotated to a specific position to align the test piece 77 with the longitudinal axis 39, when the offset shaft 81 rotates out of the required position, the axis of the test piece 77 will be shifted away from the longitudinal axis 39. Furthermore, the double offset of the bores of the offset shaft 81 and bearing housing 101 allows test pieces 77 of varying diameter to be tested within the test fixture. In particular, the dual offset ensures that only the outer diameter of the portion of the test piece 77 extending through main body 27 needs to be varied to accommodate a different size of test pieces. That is, it the case of testing multiple diameters of test pieces 77, each test piece 77 will have a different outermost diameter for the portion of the test piece 77 that resides within the screen filter 85; however, the diameter of the ends of the test piece 77 that resides within the end caps 29 will remain the same, regardless of which test piece 77 is used.

Continuing with FIG. 3, in order to generate the filter cake 97 (e.g., shown in FIG. 4), the reservoir 37 and reservoir pump 33 pump fluid through the screen filter 85 while the test piece 77 is in the first position. As the fluid is pumped from the reservoir 37 through the main body 27, particulate entrained in the fluid (which may be additives as described above) is retained on the interior of the screen filter 85, which forms a filter cake. In addition, the filter cake prevents fluid from exiting the screen filter 85, causing the internal pressure of the main body 27 to increase. This pressure is retained using O-rings (not shown) located between the various components described herein. The filter cake is formed to a requisite pressure threshold, as determined and controlled by the reservoir pump 33 in conjunction with the computer 49, inlet valve 34, inlet pressure gauge 43, outlet valve 36, and outlet pressure gauge 45. The requisite pressure threshold is determined to be similar to downhole operating conditions, and, thus, simulates forces on the test piece 77 that are substantially similar to those faced downhole. Finally, because the fluid is unable to exit the screen filter 85, a pressure differential develops between the inner surface and outer surface of the screen filter 85.

Once a sufficient pressure has been developed within the screen filter 85 and main body 27, pressure is bled off by, for example, operating the inlet valve 34 and/or outlet valve 36. During this initial phase of pumping fluid into the main body 27, the test piece 77 is disposed concentric to the longitudinal axis 39 and the test piece 77 is not in contact with the screen filter 85 such that there is an annular space between the test piece 77 and the filter cake. Subsequently, once pressure is bled off, the test piece 77 is manipulated manually by the alignment wheel 83, which is coupled to the offset shaft 81, such that the test piece 77 tangentially contacts the screen filter 85 along its length. At this point, fluid is resupplied by the reservoir 37 and reservoir pump 33, and the filter cake regenerates around the test piece 77.

However, and as noted above, the filter cake causes a pressure differential to develop between the inner and outer surfaces of the screen filter 85. Additionally, as the test piece 77 has been manipulated such that the test piece 77 is no longer concentric with the longitudinal axis 39 and instead contacts the screen filter 85, the pressure differential is applied to the test piece 77 as well. Due to the pressure imbalance, and the fact that the offset shaft 81 decouples the motion of the test piece 77 from the main body 27, the test piece 77 moves, without operator or actuator interference, into its most natural position within the filter cake. That is, the differential pressure experienced by the test piece 77 causes the test piece 77 to radially translate in relation to the longitudinal axis 39 into a position where the pressure is balanced.

Accordingly, once the test piece 77 is fully embedded within the regenerated filter cake, the test piece 77 is ready to be actuated by the roto-linear actuator 23. The test piece 77 is then dislodged from the second filter cake 97 by actuating the roto-linear actuator 23 in a linear and/or rotary manner, and the resultant forces thereof are captured by the linear pressure gauge 15, the rotary pressure gauge 19, and the computer 49. In particular, the computer 49 logs the differential pressure generated by the reservoir pump 33, the linear pump 13, and the rotary pump 17. Once the test piece 77 is dislodged from the filter cake 97, the pressure of the filter cake 97 drops, and, thus, the force and/or pressure required to dislodge the test piece 77 is determined to be the peak force and/or pressure developed immediately prior to the pressure drop. Calculation of the forces output by the pumps is routine in the art, and includes comparing the pressure and torque output by output shafts of the linear pump 13 and the rotary pump 17 to the diameter of the test piece 77. These forces may be output to an operator via a screen of the computer 49, or may be stored in a database (not shown) for future use. Alternatively, the test fixture 11 may include a series of load cells (not shown) that capture and transmit the force data directly to the computer 49.

Figure 4:
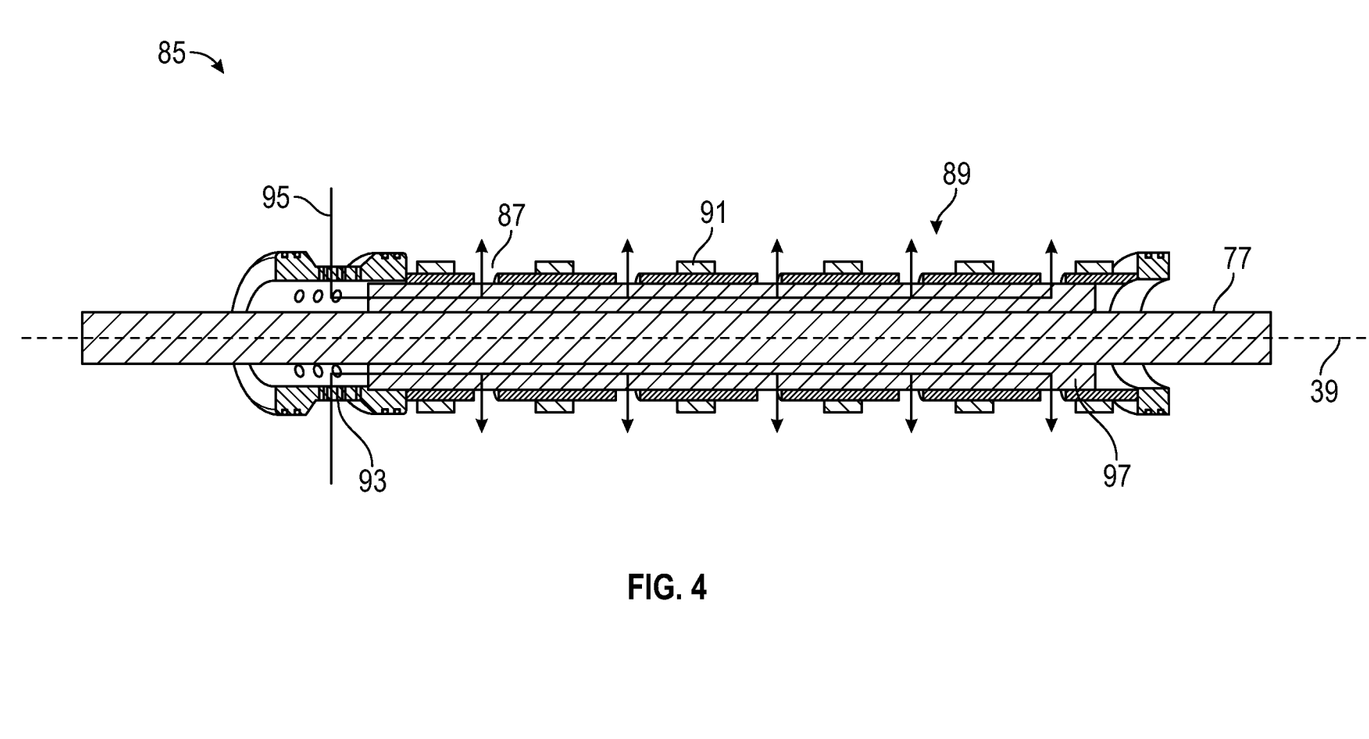
FIG. 4 depicts a side view a screen filter in accordance with one or more embodiments of the invention.

FIG. 4 depicts a screen filter consistent with one or more embodiments of the invention as described herein. Specifically, FIG. 4 depicts that a screen filter 85 includes a porous pipe with a plurality of orifices 87 extending in a radial direction, forming a mesh surface 89 in the screen filter 85. In order to preserve the structural integrity of the screen filter 85, the screen filter 85 is surrounded by a support housing 91, which is a steel or equivalent metal mesh. As shown in FIG. 4, the particulate-entrained fluid is circulated through an inlet port 93 through various fluid flow paths 95 until the fluid exits the orifices 87. Further, the orifices 87 have a diameter that is smaller than the particulate, but larger than that of the molecules of the base fluid, such that the particulate is entrapped and retained on an interior of the mesh surface 89. By way of example, in one or more embodiments, the orifices 87 may have a diameter between 2 micrometers (µm) and 40 µm, inclusive. As the particulate builds on the interior surface, the particulate forms a filter cake 97 that surrounds the test piece 77.

Once the test piece 77 is in the second position, pressure is applied to the filter cake 97 by the reservoir pump 33, which causes the filter cake 97 to regenerate around the test piece 77 until the filter cake 97 generates a requisite pressure in the screen filter 85. The second pressure may be equivalent or greater than the first pressure and simulates forces equivalent to the downhole forces experienced by a stuck drill string component, which may be empirically derived, experimentally derived, or measured at a wellbore. Once the filter cake 97 has regenerated around the test piece 77, the test piece 77 experiences differential pressures and translates within the screen filter 85 as described above. In addition, once the test piece 77 has finished translating and is embedded within the filter cake 97, the test piece 77 is actuated by an actuator, which may be a roto-linear actuator 23 as described above. The resulting forces, including the forces acting on the test piece 77, the fluid pressures, and other forces developed by the test fixture 11 are captured by a computer 49 as described above.

Figure 5A:
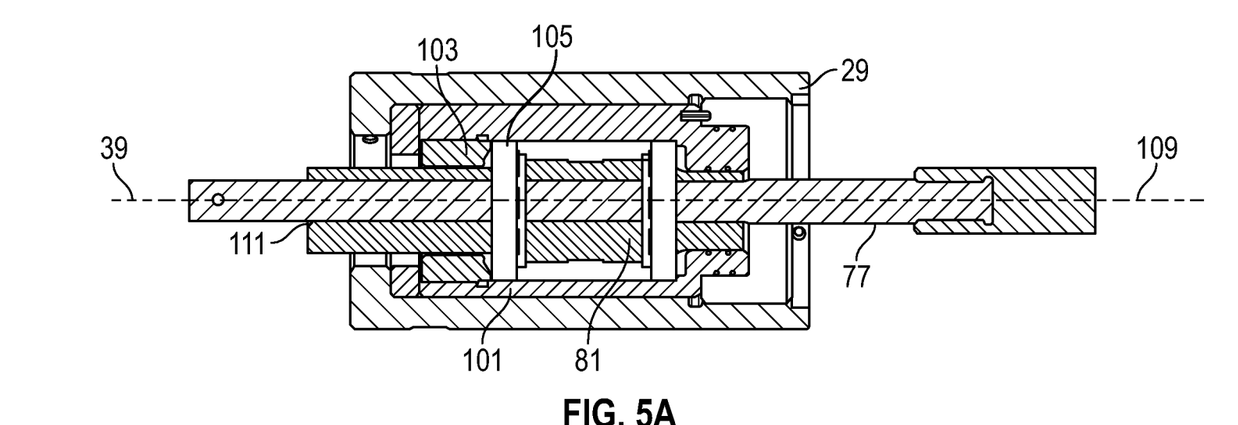
FIGS. 5A and 5B depict side views of end caps in accordance with one or more embodiments of the invention.
Figure 5B:
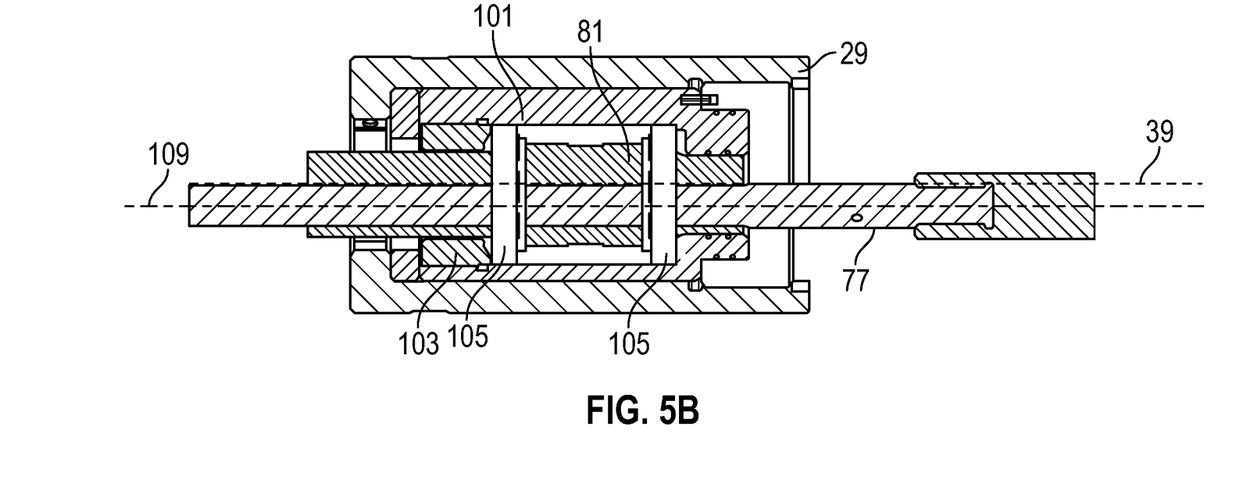

FIGS. 5A and 5B depict the end cap 29, the bearing housing 101, the offset shaft 81, and the test piece 77 in the first and second positions, respectively. As shown in FIG. 5A, in the first position the shaft orifice 111 is coaxial with the longitudinal axis 39 such that the shaft orifice 111 is concentric with an outer diameter of the end cap 29. Conversely, FIG. 5B depicts that as the test piece 77 is actuated (with the alignment wheel 83 as described above) a shaft axis 109 running through the shaft orifice 111 of the offset shaft 81 is separated from the longitudinal axis 39 in the radial direction. This separation is caused by the fact that the shaft orifice 111 of the offset shaft 81, which the test piece 77 extends through, is not concentric with the outer diameter of the offset shaft 81. Thus, as the test piece 77 is manually actuated, the test piece 77 will impart a force on the offset shaft 81 that causes the offset shaft 81 to rotate inside the bearings 105 and translate from the first position to the second position. In the second position, it can be seen that the shaft orifice 111 is no longer coaxial with the longitudinal axis 39, and, thus, the test piece 77 is disposed below the longitudinal axis 39. As noted above, the test piece 77 can freely rotate within the offset shaft 81. However, the bearing housing 101 is fixed to the end cap 29 with pins, and remains stationary as a result.

Figure 6A:
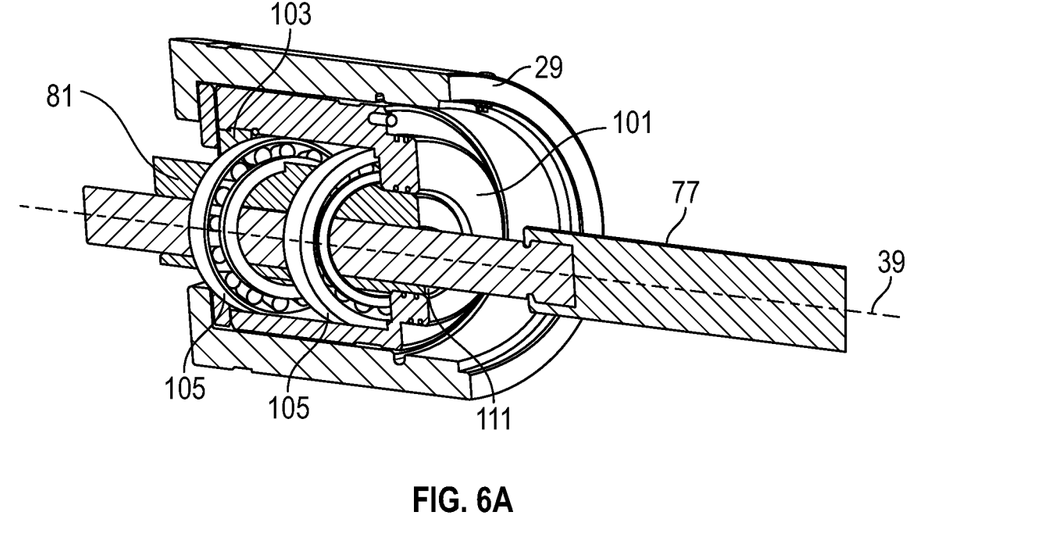
FIGS. 6A and 6B depict isometric views of end caps in accordance with one or more embodiments of the invention.
Figure 6B:
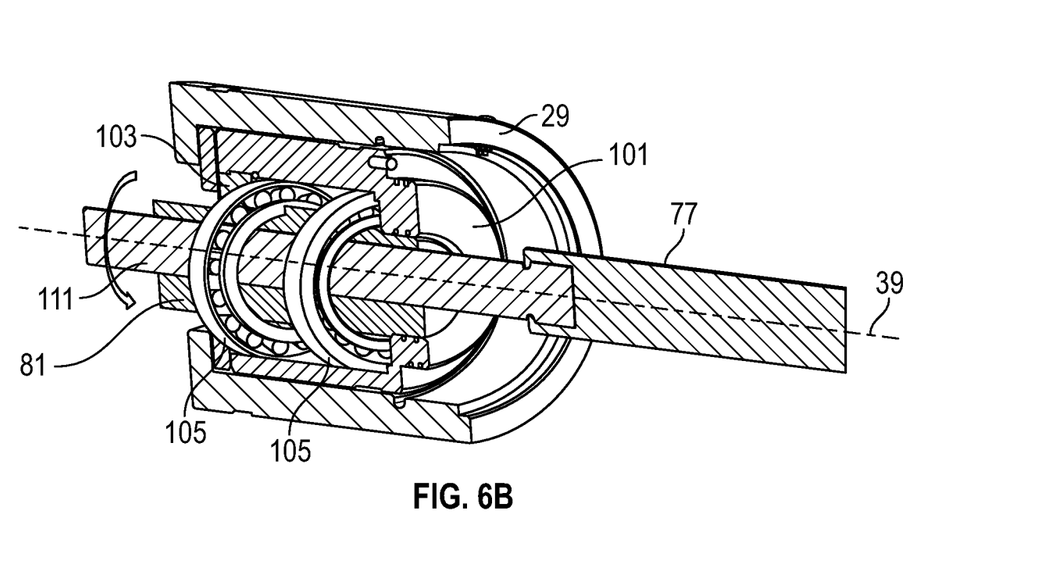

FIGS. 6A and 6B further depict isometric views of the end caps 29, the bearing housing 101, the offset shaft 81, the bearings 105, and the test piece 77 in the first and second positions, respectively. As shown in FIG. 6A, the shaft orifice 111 of the offset shaft 81 and the test piece 77 are initially coaxial to the longitudinal axis 39, which extends in directions orthogonal to the front view depicted. The offset shaft 81 is rotated via the alignment wheel 83, and the shaft orifice 111 is radially displaced from the longitudinal axis 39 as described above. Because the test piece 77 is disposed within the shaft orifice 111, the test piece 77 is also radially displaced, such that a central axis of the test piece 77 does not coincide with the longitudinal axis 39. Furthermore, the test piece 77 may shift according to the differential pressure produced across the screen filter 85 when the filter cake 97 is regenerated, as described above.

Figure 7A:
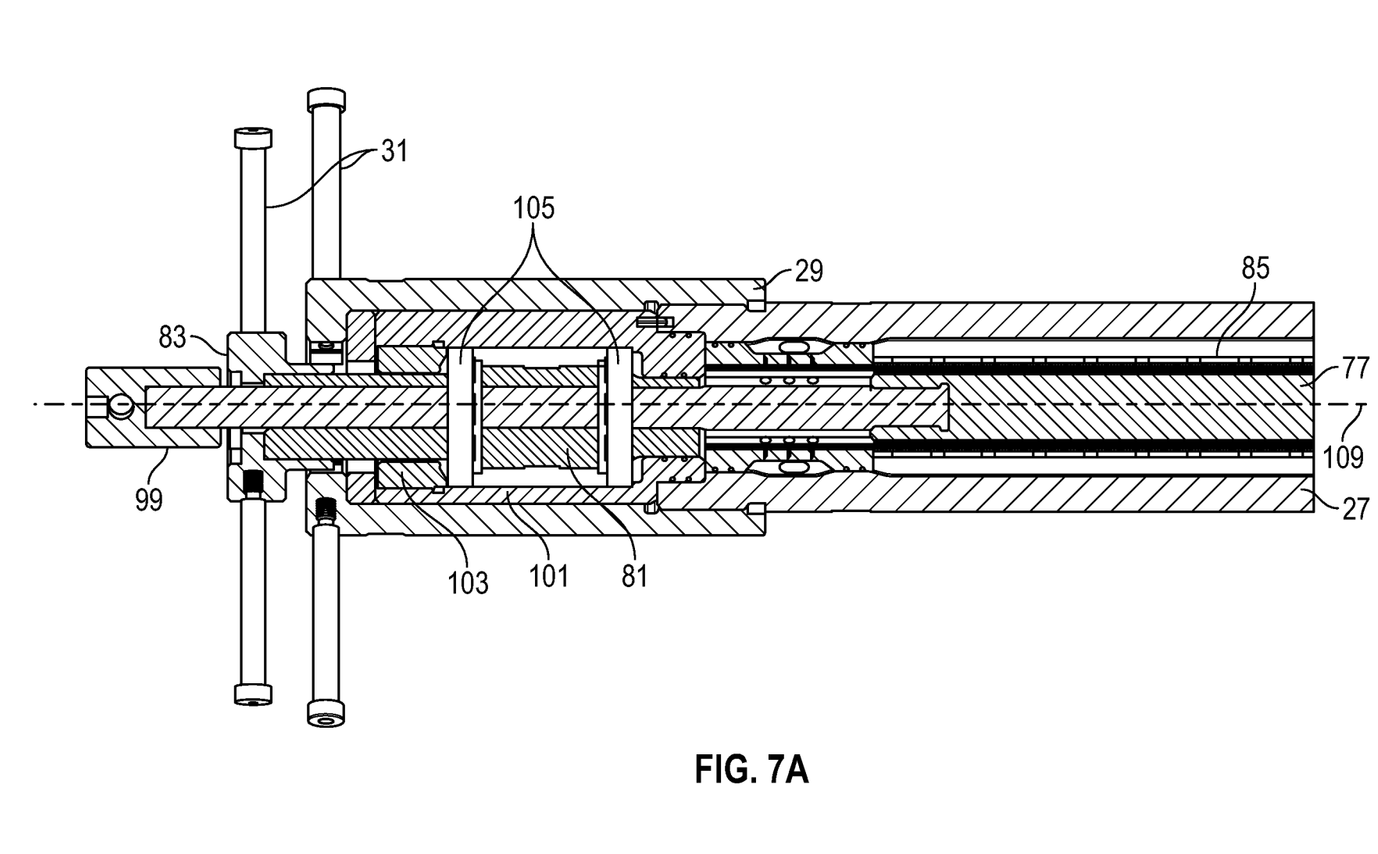
FIGS. 7A and 7B depict side views of end caps and screen filters in accordance with one or more embodiments of the invention.
Figure 7B:
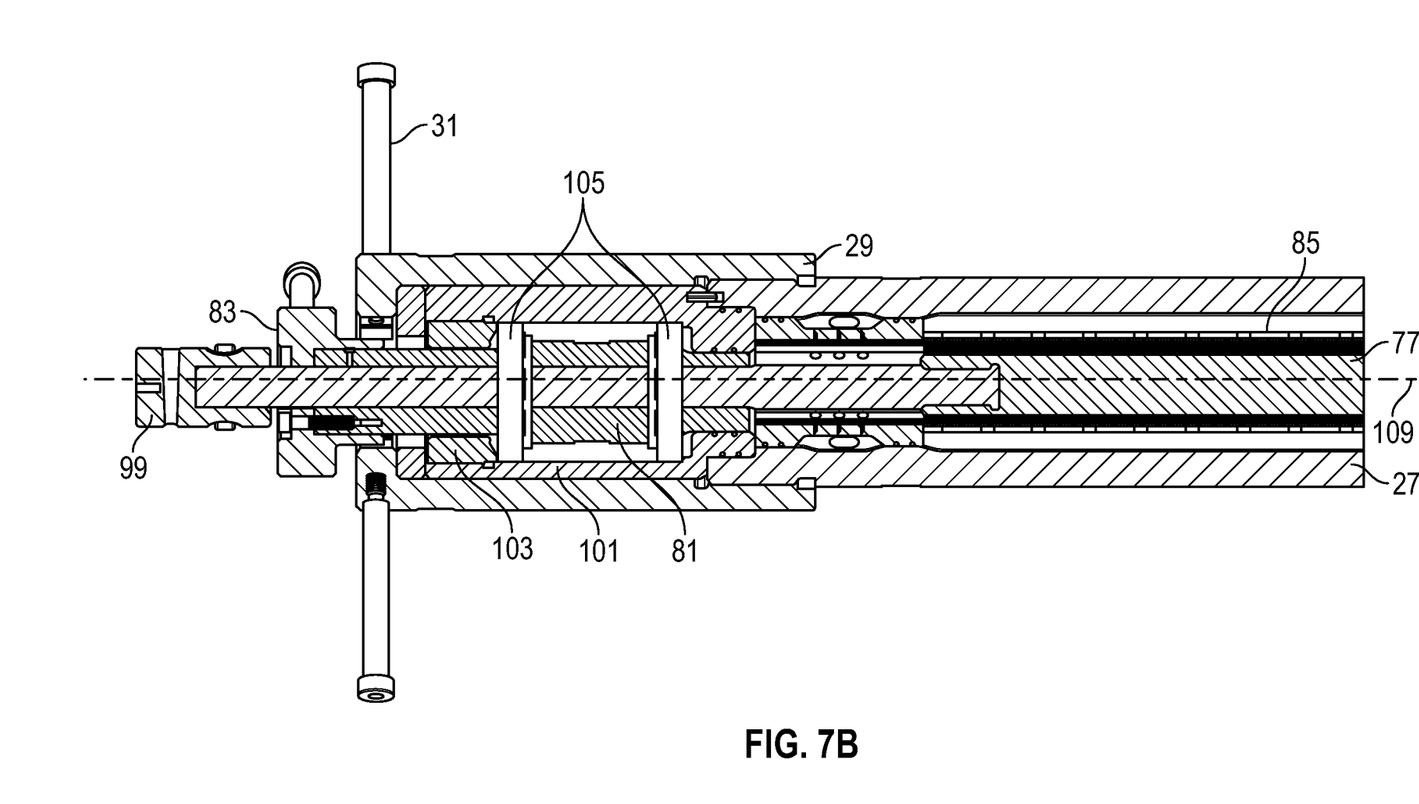

FIGS. 7A and 7B depict the test piece 77 in relation to the end cap 29, screen filter 85, main body 27, and alignment wheel 83 while the test piece 77 is in the first and second positions, respectively. As shown in FIG. 7A, in the first position the test piece 77 extends along the shaft axis 109 of the offset shaft 81, which is coaxial with the longitudinal axis 39. Accordingly, as the assembly handles 31 of the alignment wheel 83 are rotated, the offset shaft 81 fixed thereto is rotated as well. The offset shaft 81 forces the test piece 77 to translate away from the longitudinal axis 39 to a position where the test piece 77 contacts the screen filter 85 across its entire length. The shift in position occurs once the filter cake 97 has developed to a predetermined pressure, as described above, and is completed manually. Thus, in the second position, the filter cake 97 causes a pressure imbalance to develop in the screen filter 85. The test piece 77 reacts to the pressure imbalance by imparting a force onto the offset shaft 81, which, in turn, rotates to allow the test piece 77 to find a resting position in the regenerated filter cake 97. Additionally, because the offset shaft 81 is coupled to the alignment wheel 83, the resting position of the test piece 77 can be visually verified by ensuring that the alignment wheel 83 is no longer rotating after the filter cake 97 is regenerated.

Figure 8A:
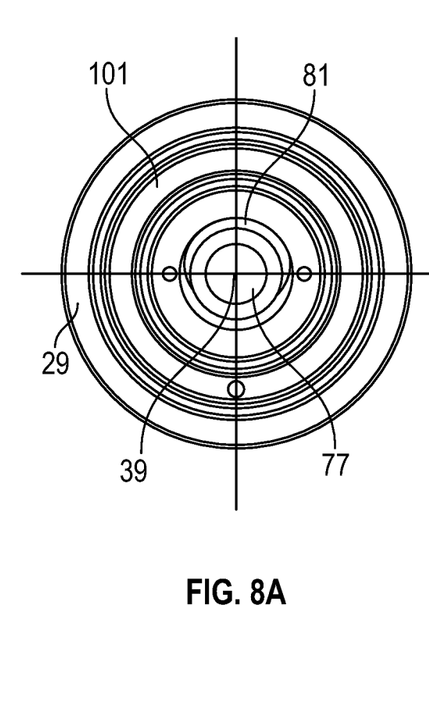
FIGS. 8A and 8B depict front views of end caps in accordance with one or more embodiments of the invention.
Figure 8B:
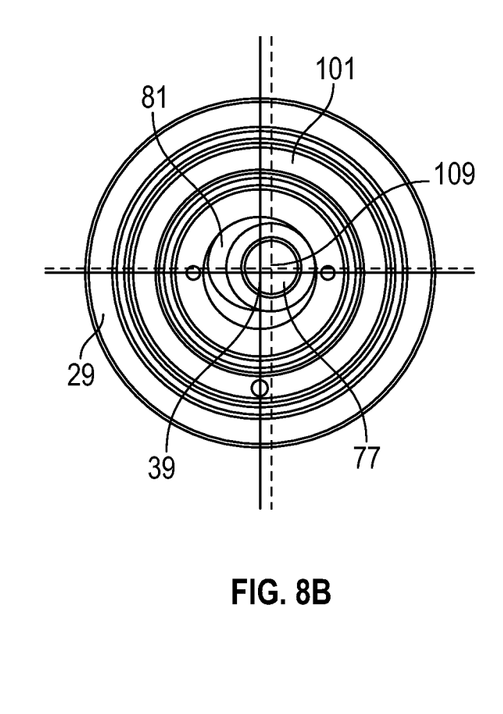

FIGS. 8A and 8B further depict front views of the end caps 29, the bearing housing 101, the offset shaft 81, and the test piece 77 in the first and second positions, respectively. As shown in FIG. 8A, the shaft orifice 111 (e.g., shown in FIGS. 6A and 6B) of the offset shaft 81 and the test piece 77 are initially coaxial to the longitudinal axis 39 and the end cap 29, which extends in directions orthogonal to the front view depicted. After the filter cake 97 is initially generated, the offset shaft 81 is rotated, which abuts against the test piece 77 and displaces the test piece 77 from the longitudinal axis 39. Thus, in the second position, the shaft axis 109 does not coincide with the longitudinal axis 39. In addition, the diameter of the test piece 77 dictates the amount that the offset shaft 81 will have to rotate in order to abut the test piece 77 against the screen filter 85 in the second position.

Figure 9:
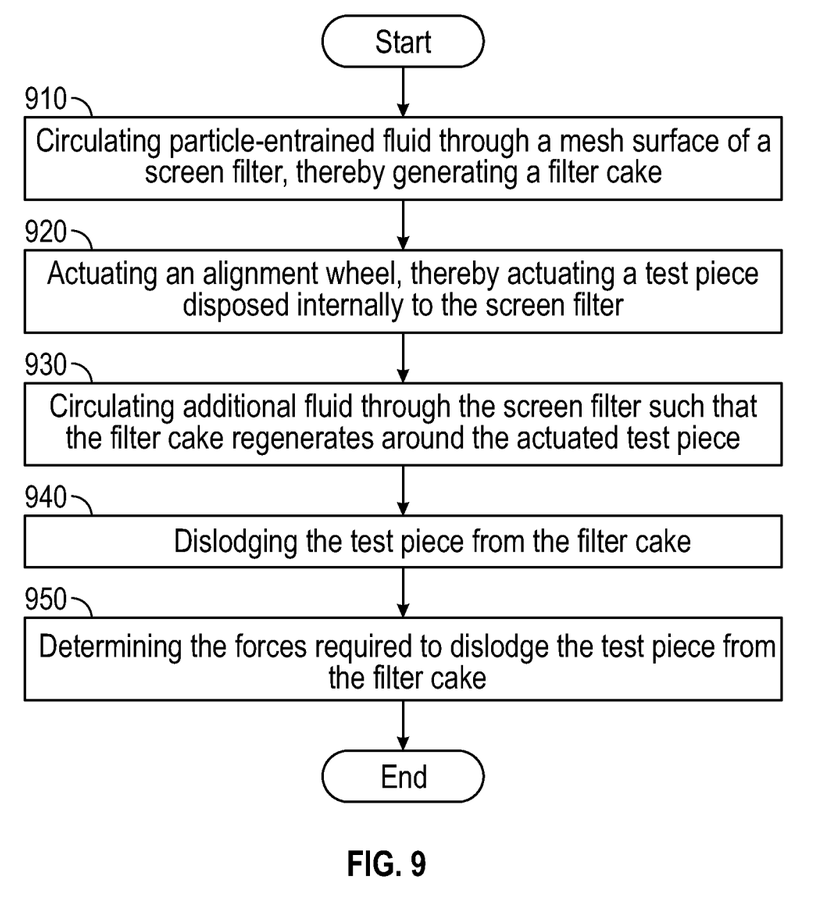
FIG. 9 depicts a flowchart of a method in accordance with one or more embodiments of the invention.

FIG. 9 depicts a flowchart illustrating a method of capturing differential sticking forces acting on a test piece 77. Steps of FIG. 9 may be performed, for example, by a test fixture 11 as described above, but is not limited thereto. As shown in FIG. 9, the method initiates at step 910, where particulate-entrained fluid is circulated through a mesh surface 89 of a screen filter 85, which generates a first filter cake 97. More specifically, as the particulate-entrained fluid circulates through the screen filter 85, the base fluid is passed through orifices 87, while the particulate additives are retained on the interior of the screen filter 85. The base fluid proceeds to circulate into the annular space between the main body 27 and the screen filter 85, and exits back to the reservoir 37. As the particulate begins to develop the filter cake 97, pressure develops within the screen filter 85. Once the pressure reaches a first requisite pressure, equivalent to or exceeding downhole conditions as described above, the pressure is bled off and the step proceeds to step 920, where the test piece is actuated.

Specifically, in step 920, the test piece 77 is actuated within the screen filter 85 into the filter cake 97. This actuation may be performed by rotating an alignment wheel 83 by an operator. The alignment wheel 83 is fixed to an offset shaft 81, and, consequently, the offset shaft 81 rotates with the alignment wheel 83. As the offset shaft 81 rotates, the offset shaft 81 forces the test piece 77 to move into the filter cake 97 until the test piece 77 abuts against the screen filter 85 such that the test piece 77 has tangential contact along the length of the filter cake 97 and screen filter 85. Once the test piece 77 is in contact with the screen filter 85, the method proceeds to step 930.

In step 930, the filter cake 97 is re-fluidized by circulating additional fluid through the screen filter 85. As the test piece 77 now resides in a second location offset from a longitudinal axis of the roto-linear actuator 23, re-fluidization of the filter cake 97 causes the filter cake 97 to develop a pressure differential, where the portion of the test piece 77 that is in contact with the screen filter 85 experiences less pressure than that portion of the test piece 77 in contact with the filter cake. The differential pressure creates a side force that causes the test piece 77 to translate in a radial direction into the filter cake 97 such that the test piece 77 is embedded within the filter cake 97 in a position where the forces are balanced and the test piece 77 is at rest. The ability of the test piece 77 to translate freely is facilitated by the combination of the offset shaft 81, the bearing housing 101, and the bearings 105 as described above.

Furthermore, the side force generated by the filter cake creates frictional forces within the filter cake that resist movement of the test piece 77. As the filter cake 97 has an equivalent pressure to downhole conditions, the forces required to remove the test piece 77 from the filter cake are similar to forces acting on a drill bit in a wellbore. Once the test piece 77 is sufficiently embedded in the filter cake 97, the method proceeds to step 940, where the test piece 77 is actuated by the roto-linear actuator 23.

In particular, during step 940 the test piece is actuated by the roto-linear actuator 23, which dislodges the test piece 77 from the filter cake 97. To do such, the roto-linear actuator 23 actuates a rotary pump 17 and a linear pump 13, which are mechanically coupled to the test piece 77 via the shaft coupling 25 such that the test piece 77 is rotated and linearly actuated within the filter cake 97. The pressures supplied to the test piece 77 by the rotary pump 17 and the linear pump 13 are captured by a computer 49, in step 950, as described below.

In step 950, the computer 49 logs the pressures supplied by the rotary pump 17 and linear pump 13, and determines the forces applied to the test piece 77. The determination process is routine in the art, and includes determining the diameter of the 77 and the pressures supplied thereto. Once the test piece 77 is dislodged from the filter cake 97, the pressure within the filter cake 97 noticeably drops, and this drop is captured by the computer 49, which logs the peak pressure prior to the pressure drop as the force required to dislodge the test piece 77 from the filter cake 97.

Accordingly, the aforementioned embodiments as disclosed relate to determining differential forces applied to a test piece. Additionally, due to the fact that the diameter of the test piece corresponds to the shaft orifice of the offset shaft, as well as the internal diameters of the shaft coupling and alignment cap, different diameters of test pieces can be tested with ease, and only requires minimal changes to the overall test fixture. Furthermore, because a filter cake is generated around the test piece and subsequently fluidized, the filter cake simulates downhole conditions when a drill string component is both embedded and not embedded within a sidewall of a wellbore. Finally, because the test fixture is assembled with threaded connections, the processes of assembling the test fixture and changing the test piece is greatly simplified.

Although only a few embodiments of the invention have been described in detail above, those skilled in the art will readily appreciate that many modifications are possible in the example embodiments without materially departing from this invention. For example, although the above methods describe multiple stages of fluidizing the filter cake, the test piece may be actuated into the second position prior to generating a filter cake. Additionally, the roto-linear actuator may be electromagnetically actuated. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A test fixture, comprising:
a cylindrical main body configured to receive a test piece, the main body extending in a longitudinal direction and comprising:
a cylindrical screen filter disposed within the main body and extending in the longitudinal direction along an axis coincident with an axis of the main body, the screen filter having a mesh surface configured to generate a filter cake when particle-entrained fluid is supplied therethrough, and
an offset shaft extending in the longitudinal direction along an offset axis that is offset from the axis of the main body when the offset shaft is actuated, wherein the test piece extends through the offset shaft,
a bearing configured to decouple rotational motion of the offset shaft from the main body,
an actuator configured to dislodge the test piece from the filter cake within the main body,
a computer configured to determine a force required to dislodge the test piece from the filter cake, and
a reservoir pump configured to pump the particle-entrained fluid into the screen filter, thereby generating the filter cake,
an alignment wheel configured to rotate the offset shaft, thereby forcing the test piece to move from a first position in which a longitudinal axis of the test piece is coincident to the longitudinal axis of the screen filter to a second position in which the longitudinal axis of the test piece is embedded in the filter cake, and
wherein the reservoir pump is configured to circulate fluid through the screen filter while the test piece is in the second position, thereby creating a differential pressure that forces the test piece to translate within the filter cake to a resting position,
wherein the test piece is disposed on an interior of the screen filter.

2. The test fixture of claim 1, wherein the test piece extends through the screen filter in the longitudinal direction.

3. The test fixture of claim 1, further comprising: a reservoir fluidly connected to the main body, the reservoir pump being configured to circulate the particle-entrained fluid from the reservoir through the screen filter.

4. The test fixture of claim 1, further comprising: a bearing housing configured to retain the bearing within an end cap of the main body.

5. The test fixture of claim 1, wherein the offset shaft is formed with an orifice extending axially therethrough, a central axis of the orifice being offset from the longitudinal axis of the offset shaft in a radial direction, the radial direction being orthogonal to the longitudinal direction.

6. The test fixture of claim 1, further comprising: a shaft coupling configured to connect an actuator shaft of the actuator to the test piece.

7. The test fixture of claim 1, wherein the screen filter is rigidly fixed to a bearing housing that surrounds the offset shaft.

8. The test fixture of claim 1, wherein the actuator is configured to rotate the test piece and actuate the test piece in the longitudinal direction.

9. The test fixture of claim 3, further comprising: a fluid pressure gauge configured to measure differential fluid pressure supplied by the reservoir pump.

10. The test fixture of claim 4, wherein the alignment wheel further comprises a plurality of handles configured to be manually actuated, thereby manually actuating the offset shaft and the test piece.

11. The test fixture of claim 5, wherein the test piece extends through the orifice of the offset shaft.

12. The test fixture of claim 6, wherein the test piece, the shaft coupling, and the actuator shaft are coaxial.

13. The test fixture of claim 6, wherein the main body, the shaft coupling, and the actuator are disposed, in sequence, along the longitudinal axis.

14. A method for determining sticking forces applied to a test piece, the method comprising:
   receiving a test piece within a cylindrical screen filter of a cylindrical main body extending in a longitudinal direction, the screen filter extending along an axis coincident with an axis of the main body,
   decoupling rotational motion of an offset shaft that the test piece extends through from the main body,
   circulating particle-entrained fluid through a mesh surface of the screen filter, thereby generating a filter cake when the particle-entrained fluid is supplied therethrough,
   actuating an alignment wheel that rotates the offset shaft that the test piece extends through such that the test piece is forced to move from a first position where a longitudinal axis of the test piece is coincident with the axis of the main body to a second position where the test piece is embedded within the filter cake,
   circulating additional fluid through the screen filter subsequent to actuating the alignment wheel such that the filter cake is regenerated around the test piece, thereby creating a differential pressure that forces the test piece to translate within the filter cake to a resting position,
   actuating the test piece such that the test piece is dislodged from the filter cake, and
   determining a requisite force required to dislodge the test piece from the filter cake.

15. The method of claim 14, further comprising: measuring differential fluid pressure created by circulating the particle-entrained fluid.

16. The method of claim 14, further comprising: rotating the test piece and applying a force to the test piece in the longitudinal direction.

17. The method of claim 14, further comprising: entrapping the entrained particles with the screen filter such that the particles are retained on the mesh surface of the screen filter while the particle-entrained fluid circulates through the screen filter, thereby generating the filter cake.

18. The method of claim 15, further comprising: measuring a force or a torque required to dislodge the test piece from the filter cake.

19. The method of claim 17, further comprising: manually actuating the alignment wheel using a plurality of alignment handles, thereby manually actuating the offset shaft.

20. The method of claim 19, wherein the offset shaft is actuated from the second position to the first position once a fluid pressure supplied by a pump reaches a requisite pressure threshold.

* * * * *